United States Patent

Hazlebeck et al.

Patent Number: 6,054,057
Date of Patent: Apr. 25, 2000

[54] DOWNFLOW HYDROTHERMAL TREATMENT

[75] Inventors: David A. Hazlebeck, El Cajon; Kevin W. Downey; Michael H. Spritzer, both of San Diego, all of Calif.

[73] Assignee: General Atomics, San Diego, Calif.

[21] Appl. No.: 08/938,899

[22] Filed: Sep. 26, 1997

[51] Int. Cl.$^7$ .................. C02F 1/68; A61B 1/30
[52] U.S. Cl. .................. 210/761; 588/226; 422/209; 422/207; 422/210
[58] Field of Search .................. 210/761; 588/226; 422/129, 209, 210, 207

[56] References Cited

U.S. PATENT DOCUMENTS

| | | | |
|---|---|---|---|
| 2,805,921 | 9/1957 | Schaumann | 423/613 |
| 2,886,418 | 5/1959 | Altimier | 422/209 |
| 4,338,199 | 7/1982 | Modell . | |
| 4,543,190 | 9/1985 | Modell . | |
| 4,822,497 | 4/1989 | Hong et al. . | |
| 5,527,471 | 6/1996 | Hong et al. . | |
| 5,545,337 | 8/1996 | Hong . | |
| 5,674,405 | 10/1997 | Bourhis et al. . | |

FOREIGN PATENT DOCUMENTS

WO96/02471  2/1996  WIPO .

OTHER PUBLICATIONS

Hong, Dr. Glenn T., Supercritical Water Oxidation Workshop, Figure 1, MODAR pilot scale system for low acid chloride and sulfate environment; and Figure 2, Corrosion test setup for high acid chloride and sulfate environment. These figures were inadvertently omitted from Dr. Hong's reference which was submitted to the United States Patent and Trademart Office on Mar. 17, 1999, in a Supplemental Information Disclosure Statement. Dr. Hong's reference was listed as reference No. 4 in Section 4 of that Supplemental Information Disclosure Statement.

Jacobs, G.P. et al., Utilization of Phoenics in the Design of the Modar Scwo Reactor, pp. 6 and 7, and Figures 3, 8 and 9, Presented in session "Reactions in Supercritical Fluids," Annual AICHE Meeting, Miami Beach, Florida, Nov. 1–6, 1992.

Kochan, R. J. et al., CFD Code Selection and Preliminary Validation for Thermal–Hydraulic Analysis of SCWO Benchscale Reactor, p. 17, Idaho National Engineering Laboratory, Idaho Falls Idaho, 83415, Dec. 1994.

Kochan, R. J. et al.,CFD Model Development and Data Comparison for Thermal–Hydraulic Analysis of HTO Pilot Scale Reactor, p. 18, and Figure 3, Idaho National Engineering Laboratory, Idaho Falls Idaho, 83415, Sep. 1995.

Hong, Glenn T., et al., Material Testing in Supercritical Water Oxidation Systems, Session VIII: Materials Testing; Corrosion Experiments, 9 pages, First International Workshop on Superciritical Water Oxidation, Jacksonville, Florida, Feb. 6–9, 1995.

*Primary Examiner*—Hien Tran
*Assistant Examiner*—James Kennedy
*Attorney, Agent, or Firm*—Nydegger & Associates

[57] ABSTRACT

A system and method for treatment of a feed material includes a reactor chamber in a reactor vessel. The reactor vessel has a longitudinal axis which is vertically oriented so that gravitational forces act generally in a direction along the axis between a top and a bottom of the vessel. A feed material is introduced by a nozzle into the reactor chamber as a jet stream through the top end of the vessel. This jet stream causes back-mixing in the reactor chamber, contributing to rapid initiation of reaction and general down flow of material through the reactor chamber. The material in the reactor chamber can be quenched to dissolve sticky solids in the effluent before the effluent is discharged from the lower end of the vessel. Further, the reactor vessel can include a plug flow section to carry out additional reaction of the feed material.

46 Claims, 3 Drawing Sheets

DOWNFLOW HYDROTHERMAL TREATMENT

FIELD OF THE INVENTION

The present invention pertains generally to methods and systems for accomplishing hydrothermal treatment for the purposes of either waste destruction, energy generation, or production of chemicals. More specifically, the present invention pertains to methods and systems for the hydrothermal treatment of organics which contain or generate inorganic compounds such as salts or oxides during such oxidation. The present invention is particularly, but not exclusively, useful as a method and system for using a reactor to accomplish hydrothermal treatment which avoids the unwanted build-up of inorganic compounds in the reactor.

BACKGROUND OF THE INVENTION

The present invention relates generally to the conversion of a broad spectrum of materials and especially to a method for the hydrothermal treatment of organics containing or generating inorganic compounds such as salts or oxides, at supercritical temperature and pressure conditions, or at supercritical temperatures and elevated, yet subcritical pressures.

The process of wet oxidation has been used for the treatment of aqueous streams for over thirty (30) years. In general, the process involves the addition of an oxidizing agent, typically air or oxygen, to an aqueous stream at elevated temperatures and pressures. The resultant "combustion" of organic or inorganic oxidizable materials occurs directly within the aqueous phase.

A wet oxidation process is typically characterized by operating pressures of 30 bar to 250 bar (440 psia–3,630 psia) and operating temperatures of one hundred fifty degrees Celsius to three hundred seventy degrees Celsius (150° C.–370° C.), for which liquid and gas phases coexist for aqueous media. Since gas phase oxidation is quite slow at these temperatures, the reaction is primarily carried out in the liquid phase. The reactor operating pressure is typically maintained at or above the saturated water vapor pressure, so that at least part of the water is present in liquid form. Even in the liquid phase, however, reaction times for substantial oxidation are on the order of one (1) hour. In many applications, reaction times of this length are unacceptable.

In addition to unacceptably long reaction times, the utility of conventional wet oxidation is limited by several factors. These include: the degree of oxidation attainable; an inability to adequately oxidize refractory compounds; and the lack of usefulness for power recovery due to the low temperature of the process. For these reasons, there has been considerable interest in extending wet oxidation to higher temperatures and pressures. For example, U.S. Pat. No. 2,944,396, which issued Jul. 12, 1960 to Barton et al., discloses a process wherein an additional second oxidation stage is accomplished after wet oxidation. In the Barton process, unoxidized volatile combustibles which accumulate in the vapor phase of the first stage wet oxidation reactor are sent to complete their oxidation in the second stage. This second stage is operated at temperatures above the critical temperature of water, about three hundred seventy four degrees Celsius (374° C.).

A significant development in the field occurred with the issuance of U.S. Pat. No. 4,338,199, to Modell on Jul. 6, 1982. The Modell '199 patent discloses a wet oxidation process which has come to be known as supercritical water oxidation ("SCWO"). As the name SCWO implies, in some implementations of the SCWO process, oxidation occurs essentially entirely at conditions which are supercritical in both temperature (>374° C.) and pressure (>about 3,200 psi or 220 bar). Importantly, SCWO has been shown to give rapid and complete oxidation of virtually any organic compound in a matter of seconds at five hundred degrees Celsius to six hundred fifty degrees Celsius (500° C.–650° C.) and 250 bar. During this oxidation, carbon and hydrogen in the oxidized material form the conventional combustion products carbon dioxide ("$CO_2$") and water. When chlorinated hydrocarbons are involved, they give rise to hydrochloric acid ("HCl"), which will react with available cations to form chloride salts. Due to the adverse effects of HCl, alkali may be intentionally added to the reactor to avoid high, corrosive concentrations of hydrochloric acid in the reactor and especially in the cooldown equipment following the reactor. When sulfur oxidation is involved, the final product in SCWO is a sulfate anion. This is in contrast to normal combustion, which forms gaseous sulfur dioxide ("$SO_2$"). As in the case of chloride, alkali may be intentionally added to avoid high concentrations of sulfuric acid. Similarly, the product of phosphorus oxidation is phosphate anion.

At typical SCWO reactor conditions densities are in the range of 0.1 g/cc, so water molecules are considerably farther apart than they are in ambient liquid water. Hydrogen bonding, a short-range phenomenon, is almost entirely disrupted, and the water molecules lose the ordering responsible for many of liquid water's characteristic properties. In particular, solubility behavior is closer to that of high pressure steam than to liquid water. Smaller polar and nonpolar organic compounds, with relatively high volatility, will exist as vapors at typical SCWO conditions, and hence will be completely miscible with supercritical water. Gases such as $N_2$, $O_2$, and $CO_2$ show similar complete miscibility. Larger organic compounds and polymers will hydrolyze to smaller molecules at typical SCWO conditions, thus resulting in solubilization via chemical reaction. The loss of bulk polarity by the water phase has striking effects on normally water-soluble salts, as well. In particular, because they are no longer readily solvated by water molecules, salts frequently precipitate out as solids which can deposit on process surfaces and cause fouling of heat transfer surfaces or blockage of the process flow.

A process related to SCWO known as supercritical temperature water oxidation ("STWO") can provide similar oxidation effectiveness for certain feedstocks but at lower pressure. This process has been described in U.S. Pat. No. 5,106,513, issued Apr. 21, 1992 to Hong, and utilizes temperatures in the range of six hundred degrees Celsius (600° C.) and pressures between 25 bar to 220 bar. On the other hand, for the treatment of some feedstocks, the combination of temperatures in the range of four hundred degrees Celsius to five hundred degrees Celsius (400° C.–500° C.) and pressures of up to 1,000 bar (15,000 psi) have proven useful to keep certain inorganic materials from precipitating out of solution (Buelow, S. J., "Reduction of Nitrate Salts Under Hydrothermal Conditions," Proceedings of the 12$^{th}$ International Conference on the Properties of Water and Steam, ASME, Orlando, Fla., September, 1994). The various processes for oxidation in an aqueous matrix are referred to collectively as hydrothermal oxidation, if carried out at temperatures between about three hundred seventy-four degrees Celsius to eight hundred degrees Celsius (374° C.–800° C.), and pressures between about 25 bar to 1,000 bar. Similar considerations of reaction rate, solids handling, and materials corrosion apply also to the related process of hydrothermal reforming, in which an oxidant is largely or entirely excluded from the system in order to form products which are not fully oxidized. The processes of hydrothermal oxidation and hydrothermal reforming will hereinafter be jointly referred to as "hydrothermal treatment."

One of the key issues which must be addressed in the application of hydrothermal oxidation is the means by which incoming feed material is brought up to reaction temperature. A typical approach is the use of a heater or heat exchanger, in which the feed material passes through an elongated tube or tubes to absorb heat. For many feed materials, however, the possibility of organic char formation, inorganic scaling, and corrosivity can make the operation of such a heat exchanger or heater very difficult. Use of such a heating scheme has the further effect of increasing the specific energy of the feedstock, so that feeds must be processed at more dilute levels. This is appropriate for feeds dilute in organic, but a disadvantage for concentrated organic feeds. For example, a cold feed with a heating value of 1,800 Btu/lb will reach an adiabatic oxidation temperature of about six hundred degrees Celsius (600° C.) when air or oxygen is used as the oxidant. If, however, this same feed has been preheated to about three hundred seventy-five degrees Celsius (375° C.), the approximate temperature at which rapid reaction commences, it is limited to a heating value of 900 Btu/lb to reach six hundred degrees Celsius (600° C.). Thus, the organic content of the preheated feed can only be about half that of the un-preheated feed.

A second key issue pertaining to hydrothermal oxidation processes is the means by which feed streams containing or generating sticky solids are handled. It is well-known that such feed streams can result in solids accumulation within and eventual plugging of the process equipment. Sticky solids are generally comprised of salts, such as halides, sulfates, carbonates, and phosphates. One of the earliest designs for handling such solids on a continuous basis is given in U.S. Pat. No. 4,822,497. Reaction is carried out in a vertically oriented vessel reactor. Solids form as the reaction proceeds and are projected and fall into a cooler brine zone maintained at the bottom of the reactor. The sticky solids re-dissolve in the brine and may be continually drawn off from the reactor. Solids separation is achieved because only the fraction of the process stream necessary for solids dissolution and transport is withdrawn as brine. The balance of the process stream, which is frequently the largest portion, is caused to reverse flow to an upward direction within the reactor, and is withdrawn from the reactor top section. By this means, it becomes possible to recover a hot, nearly solids-free stream from the process. To minimize entrainment of solid particles in the upward flow within the reactor, the velocity is kept to a low value by using a large cross-section reactor vessel. Experience has shown that while a large fraction of the sticky solids is transferred into the brine zone, a certain portion also adheres to the vessel walls, eventually necessitating an online or off-line cleaning procedure. It is also likely that the amount of solids deposited on the reactor walls is exacerbated by the reversing flow pattern within the reactor. Thus, this design may have drawbacks for the processing of certain feedstocks.

In light of the above, it is an object of the present invention to provide a system and method for hydrothermal treatment which continuously and reliably handles waste streams containing or generating significant quantities of sticky solids while minimizing the need for flushing of the reactor walls. Another object of the present invention is to provide a system and method for accomplishing hydrothermal treatment in a continuous online process wherein the reactor residence time of the material being reacted is less than one (1) minute. Still another object of the present invention is to provide a system and method for accomplishing hydrothermal treatment which uses a simple geometry in order to minimize the surface area subject to solids deposition and adherence. Yet another object of the present invention is to provide a system and method for accomplishing hydrothermal treatment which is easy to implement, simple to use, and cost effective.

SUMMARY

In accordance with the present invention, a system for performing hydrothermal treatment at temperatures in a range from above three hundred seventy-four degrees Celsius (374° C.) to about eight hundred degrees Celsius (800° C.) and at pressures above about 25 bars, includes a substantially cylindrically shaped vessel which forms a reactor chamber. The vessel defines a longitudinal axis and has both a top end and a bottom end. For purposes of the present invention, the vessel is preferably oriented with its longitudinal axis aligned vertically so that gravitational forces will act generally parallel to this axis and in a direction from the top end of the vessel toward the bottom end of the vessel. Thus, the downflow of material through the vessel is assisted by gravity.

A jet assembly is mounted at the top end of the vessel to introduce a stream or a plurality of streams of pressurized feed material into the reactor chamber. Importantly, the jet assembly directs the stream of pressurized feed material into the reactor chamber in a direction so that the stream does not directly impinge on the walls of the reactor chamber. Due to the velocity at which the stream is introduced into the reactor chamber, a back-mixing action is established in the upper back-mixing section of the reactor chamber. For purposes of the present invention, this back-mixing is beneficial in that it promotes reaction within the reactor chamber.

Below the back-mixing section, there is a plug flow section. This plug flow section, in comparison with the back-mixing section, is characterized by minimal back-mixing. In this plug flow section of the reactor chamber, additional reaction can be accomplished, if necessary.

As indicated above, it is an important characteristic of the present invention that the overall average flow of the reaction stream through the reactor chamber is in a substantially linear direction through the vessel. Stated succinctly, in a preferred embodiment, the present invention provides an improved hydrothermal process which is carried out in a unidirectional downflow arrangement wherein the feed material is supplied through the top of the vessel and the reaction stream is removed through the bottom of the vessel. Further, it is an important characteristic of the present invention that the movement of the reaction stream through the reactor chamber is due to both gravitational effects and the downflow of the bulk fluid in the reactor. It is to be appreciated that the dimensions of the reactor can be set to allow for effective flow through the reactor without causing a build up of sticky solids. For this purpose, the length-to-diameter ratio of the reactor is typically between 1:1 to 50:1.

In an alternate embodiment of the present invention, a quenching line may be used to introduce a quenching fluid into a lower, quenching section of the reactor chamber. This quenching can serve several purposes. Most importantly, the quench stream mixes with the reaction stream to cause redissolution of sticky solids. Once redissolved, the sticky solids may then exit the reactor chamber without causing plugging. After the reaction stream exits the reactor chamber it is cooled and depressurized so that the gas and liquid by-products can be properly disposed of or collected.

The present invention is advantageous compared to the reversing flow design of U.S. Pat. No. 4,822,497 because it avoids the bypassing which can occur with this design and also is simpler in that it can entail only a single stream exiting the reactor. Furthermore, the present method incorporates a plug flow section to guarantee high conversion of the feed material. As compared to an elongated tubular reactor, for example, that is specified in U.S. Pat. No. 5,252,224, this invention has the advantage of less susceptibility to solids plugging. In addition, the reactor vessel disclosed has a considerably lower surface-to-volume ratio than the tubular reactor, facilitating the use of corrosion resistant construction or liners and reducing heat loss. Tubular reactors also require multiple expensive joints and are not amenable to injection of ambient temperature feed.

While the present invention may frequently be practiced without mechanical means for removal of solids deposits from the reactor, it is also compatible with applications which may require such means.

While the goal of the present invention is frequently a high degree of oxidation, the methods of the present invention will also be useful in similar applications where partial or no oxidation is desired. In the latter case, feed material is reformed by hydrolysis. Examples of such reforming processes include U.S. Pat. No. 3,850,738, which describes the production of liquid organics from coal and U.S. Pat. No. 4,113,446, which describes the production of gaseous materials from various organic feedstocks. Both of these patents utilize supercritical water conditions.

In addition, a goal of the present invention can be the generation of useful energy, e.g., power or heat.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
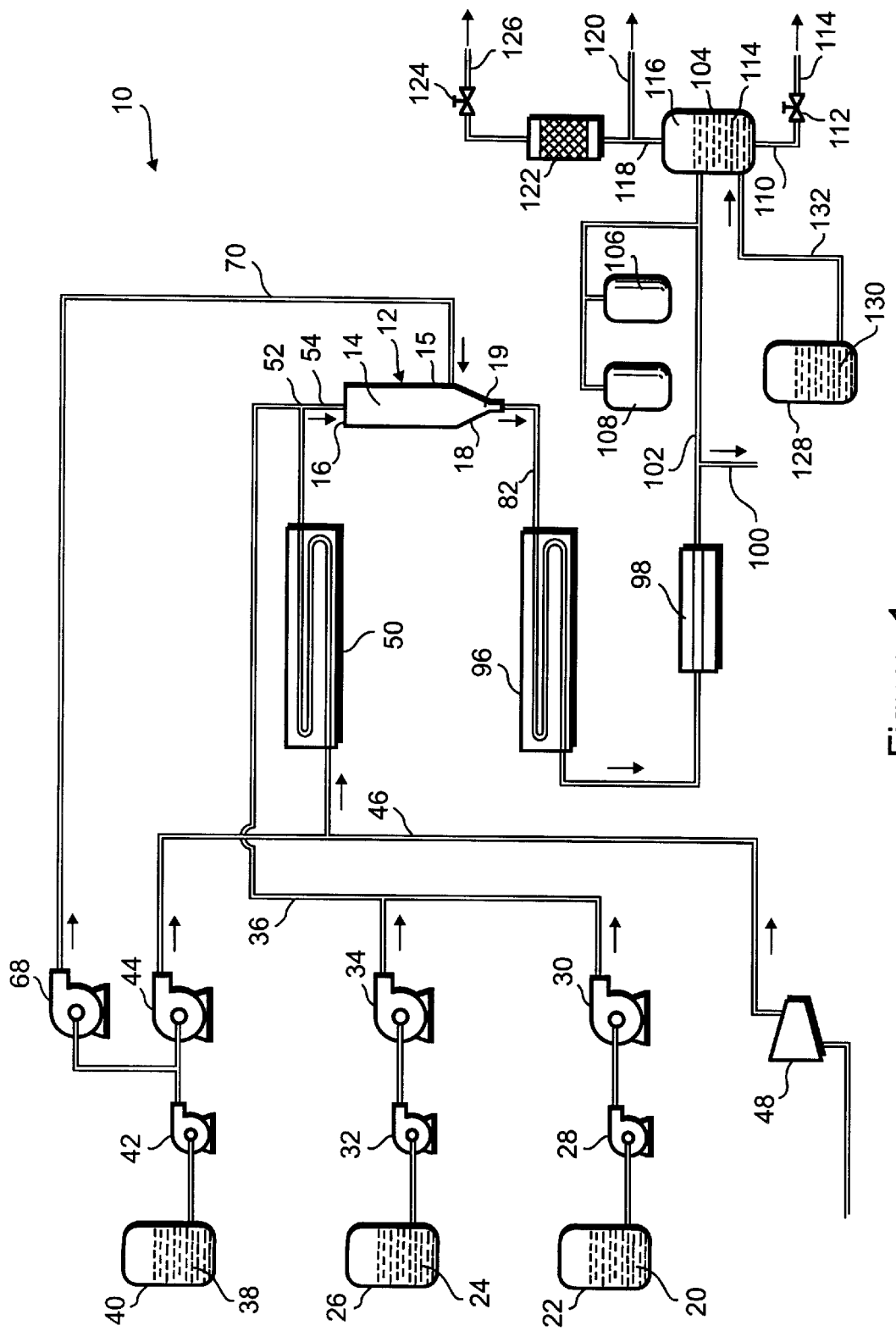
FIG. 1 is a schematic diagram of the components of a system in accordance with the present invention.

Referring initially to FIG. 1, a hydrothermal treatment system in accordance with the present invention is shown schematically and is generally designated 10. As shown, the system 10 includes a reactor vessel 12 which has a reactor chamber 14 having side walls 15. It is also shown that the reactor vessel 12 has a top end 16 and a bottom end 18. Preferably, the reactor vessel 12 is substantially vertically oriented with the top end 16 directly above the bottom end 18 so that gravitational forces will act to draw the combustible material through the reactor chamber 14. It is to be appreciated, however, that the vessel 12 can be oriented other than vertically, as long as an exit section 19 is below the reaction zone so that density instabilities are avoided and as long as excessive solids do not fall onto and accumulate on the side walls 15. Regardless of the particular orientation, the important factor, which is more fully set forth below, is that there be a substantially unidirectional flow of material through the vessel 12.

The feed material to reactor vessel 12 of the system 10 can, in certain embodiments, include four separate identifiable constituents. These are: (1) the reactant to be processed; (2) an auxiliary fuel, if necessary to sustain reaction in the reactor chamber 14; (3) water; and (4) a pressurized oxidant. More specifically, FIG. 1 shows that the reactant 20 which is to be processed is initially held in a holding tank 22. As contemplated for the present invention, the reactant 20 can consist of organic material, inorganics, particulates, sludge, soil, neutralizing agents, salt-forming agents, minerals, and/or combustible material. As indicated in FIG. 1, it may be necessary to combine this reactant 20 with an auxiliary fuel 24, such as ethanol, which can be initially held in a holding tank 26.

FIG. 1 shows that both the reactant 20 and the auxiliary fuel 24, if used, are pressurized before being introduced into the reactor chamber 14. Specifically, a transfer pump 28 and high pressure pump 30 are used to pressurize the reactant 20. Similarly, a transfer pump 32 and a high pressure pump 34 are used to pressurize the auxiliary fuel 24. As shown for the schematic of system 10 in FIG. 1, the pressurized reactant 20 and auxiliary fuel 24 are combined in line 36 and transferred to the top end 16 of the reactor chamber 14. It is to be noted that while the reactant 20 and auxiliary fuel 24 are respectively pressurized by high pressure pumps 30 and 34 to pressures above about 220 bar, they are not necessarily raised in temperature prior to being introduced into the reactor chamber 14. Thus, as intended for the system 10, the reactant 20 can be introduced into the reactor chamber 14 at ambient temperatures.

In addition to the reactant 20 and auxiliary fuel 24, the feed material to reactor chamber 14 can also include pressurized water 38 and a pressurized oxidant. Specifically, water 38 is drawn from holding tank 40 by transfer pump 42 and is thereafter pressurized by high pressure pump 44 before it is passed into line 46. At the same time, air, or some other oxidant, is pressurized by a compressor 48 and is passed into the line 46. For purposes of the present invention, the oxidant to be used, as an alternative to air, can be pure liquid or gaseous oxygen, enriched air, hydrogen peroxide, nitric acid, nitrous acid, nitrate, and nitrite. Alternatively, a substoichiometric oxidant can be used for applications in which partial oxidation of the reactant 20 is desired. In any event, at this point the pressurized water 38 and compressed air (oxidant) are mixed and introduced into a preheater 50. As contemplated by the present invention, the heating of the pressurized water/air mixture in preheater 50 can be accomplished in several ways. For example, this preheat may be accomplished by a regenerative heat exchange with hot reaction stream from reactor chamber 14. The preheat can also be accomplished by an external source, such as electricity, or a fired heater, or a combination of these. External heat sources must be used for preheater 50 when a cold startup of the system 10 is required. On the other hand, it should also be noted that for reactant 20 which has sufficient inherent heating value by itself, the preheater 50 may be shut down once a steady state operation of the system 10 has been achieved.

As the air/water mixture leaves the preheater 50, it is mixed with the reactant 20 and auxiliary fuel 24 from the line 36. This mixing occurs at the junction 52, and the feed material, including the combination of reactant 20, auxiliary fuel 24, water 38, and compressed air (oxidant) is then introduced into the reactor chamber 14 via a duct 54. As will be appreciated by the skilled artisan, an alternative for the system 10 is to use separate ducts for introducing one or more of the streams which make up the feed material into the reactor chamber 14. If so, one duct could be used for the introduction of the reactant 20 and auxiliary fuel 24, and another duct would be used for the introduction of water 38 and oxidant. Similarly, a separate duct could be used for the reactant 20, the auxiliary fuel 24, the water 38, and the oxidant. Further, depending upon the particular reactant 20, it may be important to use a high shear mixer 51 at the junction 52 to mix the feed/fuel stream from line 36 with the water/oxidant stream from the preheater 50. For example, if the reactant 20 is largely water insoluble, high shear mixing is desirable to ensure sufficient mixing of combustible materials and high pressure oxidant.

Figure 2:
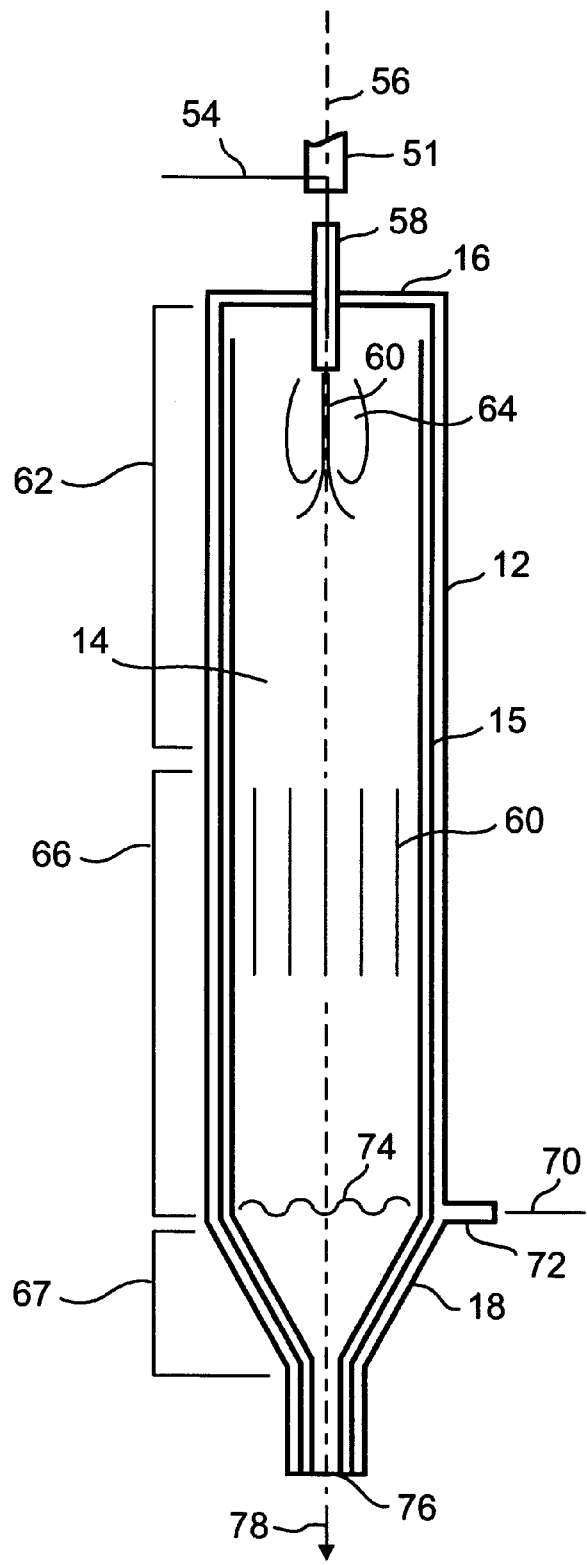
FIG. 2 is a schematic cross-sectional representation of a reactor for the present invention, showing flow characteristics within the reactor.

Referring now to FIG. 2, it will be seen that the vessel 12 and reactor chamber 14 generally define a longitudinal axis 56. As implied above, for purposes of the present invention, it is preferable that this longitudinal axis 56 of vessel 12 be vertically oriented with the top end 16 directly above the bottom end 18. With this orientation, all of the material that is to be introduced into the reactor chamber 14 through the duct 54 is passed through a nozzle 58. Importantly, the nozzle 58 introduces a stream of material 60 into the reactor chamber 14 of the vessel 12 in a direction which is substantially along the axis 56. In one embodiment, the nozzle 58 can introduce a straight single jet of the stream 60 at a velocity of about fifty feet per second (50 fps). In another embodiment, the nozzle 58 can consist of a plurality of nozzles 58 with their respective streams 60 introduced as jets which are inclined toward the axis 56 as seen in FIG. 2. With this inclination, the streams 60 are directed slightly toward each other for collision with each other.

Importantly, it is desirable that the feed material from nozzle 58 be directed so as not to directly impinge on the walls 15 of the reactor chamber 14. In this way, build up of solid materials on the walls 15 of the reactor chamber 14 can be minimized. In both cases, the reaction stream 60 is introduced into the upper portion of the reactor chamber 14 where it is subjected to vigorous back-mixing. Specifically, fluid flow in this back-mixing section 62 is characterized by a turbulence in the reaction stream 60 that results from entraining shear forces and eddies 64 which are set up as the feed material enters into the reactor chamber 14. The feed material is thus rapidly brought above the supercritical temperature of three hundred seventy-four degrees Celsius (374° C.) and rapid reaction commences. Further, while the present system 10 avoids direct impingement of the reaction stream 60 onto the walls 15, heat transfer from the walls 15 in the back-mixing section 62 can assist in the propagation of the reaction within the vessel 12.

Below the back-mixing section 62 in reactor chamber 14 is a plug flow section 66. This plug flow section 66 is characterized by the fact that there is no large scale back-mixing of the reaction stream 60 in this lower portion of the reactor chamber 14. The flow of the reaction stream 60 in the plug flow section 66, however, does exhibit local turbulent mixing.

In certain applications, it may be advantageous to provide a filtering device below the plug flow section 66. Such a device is useful for trapping low levels of sticky solids or for retaining particulates within the reactor until they have been completely reacted.

The present system 10 can also include a quenching section 67 below the plug flow section 66 to cool the effluent stream. It may be desirable to quench the effluent stream for a number of reasons, including to re-dissolve any sticky solids that may have developed during the reaction, to allow the use of the lesser materials outside the reactor, and/or to adjust the pH of the effluent stream. Returning to FIG. 1, for the moment, it can be seen that a high pressure pump 68 is positioned to take water 38 from holding tank 40 and pass it along via line 70 to an input duct 72 (See FIG. 2) below the plug flow section 66 near the bottom 18 of the reactor chamber 14. The water 38 injected through duct 72 is used for quenching the reaction stream 60 in the quenching section 67. Specifically, the quenching fluid that is introduced through duct 72 mixes with the reaction stream 60 and re-dissolves any sticky solids which developed during reaction in the reactor chamber 14. This quenching occurs below the quench fluid level 74, but above the exit port 76, so that the reaction stream 60 can pass through exit port 76 and into the line 82 without causing plugging or fouling of the exit port 76.

It will be appreciated by the skilled artisan that fluids such as high pressure gas, rather than water, can be used as a quenching medium. Also, it will be appreciated that water from an external source, or relatively dirty water (e.g., sea water), or cool, recycled reaction stream can be used as a quenching medium. These options would help to reduce the system's need for clean quench water. Additionally, it should be appreciated that the cooling fluid should be relatively cool when compared to the reaction stream to provide the quenching medium. Stated another way, the cooling fluid need only be cooler than the reaction stream to cool the reaction stream.

Further, it is contemplated by the present invention that the quenching duct 72 can be oriented to direct the quenching medium directly toward the exit port 76. Thus, the momentum of the quenching medium can be used to assist in clearing the exit port 76. In certain applications, it may not be necessary to reduce the reactor exit temperature sufficiently to re-dissolve any or all the salt particles.

Figure 3:
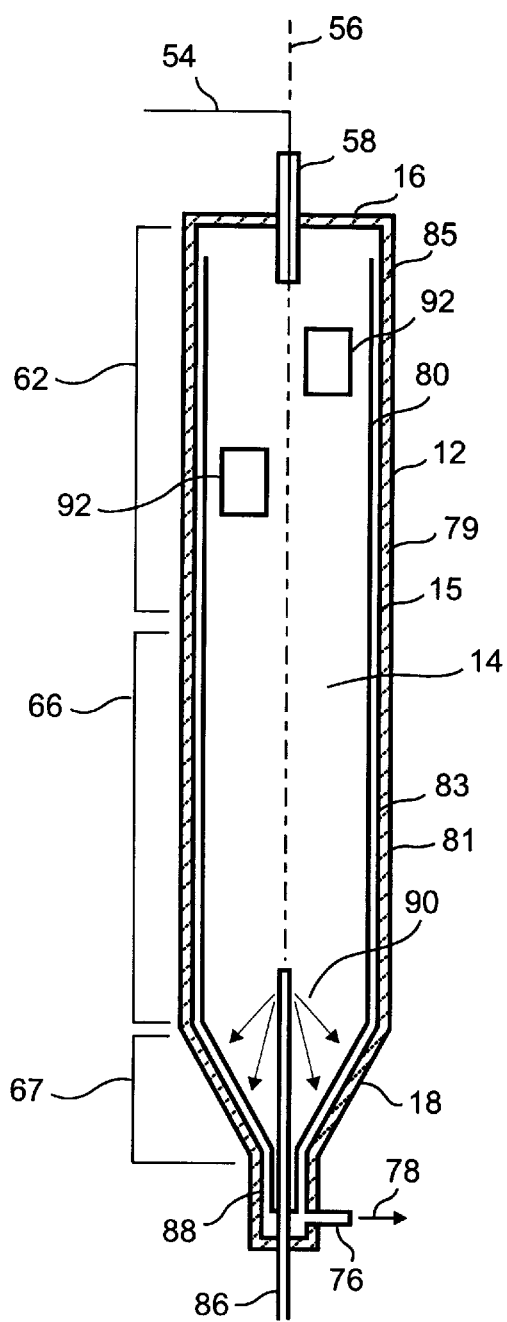
FIG. 3 is a schematic cross-sectional representation for an alternate embodiment of the reactor for the present invention.

The reactor chamber 14 is shown in FIG. 2 as a simple, single-walled vessel. Alternately, as shown in FIG. 3, the reactor chamber 14 may include an inner wall 79 and a pressure bearing wall 81. The inner wall 79 can include a corrosion resistant liner. Further, the inner wall 79 can be isolated from the pressure bearing wall 81 or pressure shell. In this design, insulating material 85 may be included in a gap 83 between the inner wall 79 and the pressure bearing wall 81 in order to allow the pressure bearing wall 81 to operate at a relatively low temperature. Furthermore, as with the liner, the surfaces in contact with the process may be comprised of a corrosion resistant material, or coated with a corrosion resistant material. Suitable corrosion resistant materials include titanium, platinum, iridium, titania, and zirconia.

Figure 4:
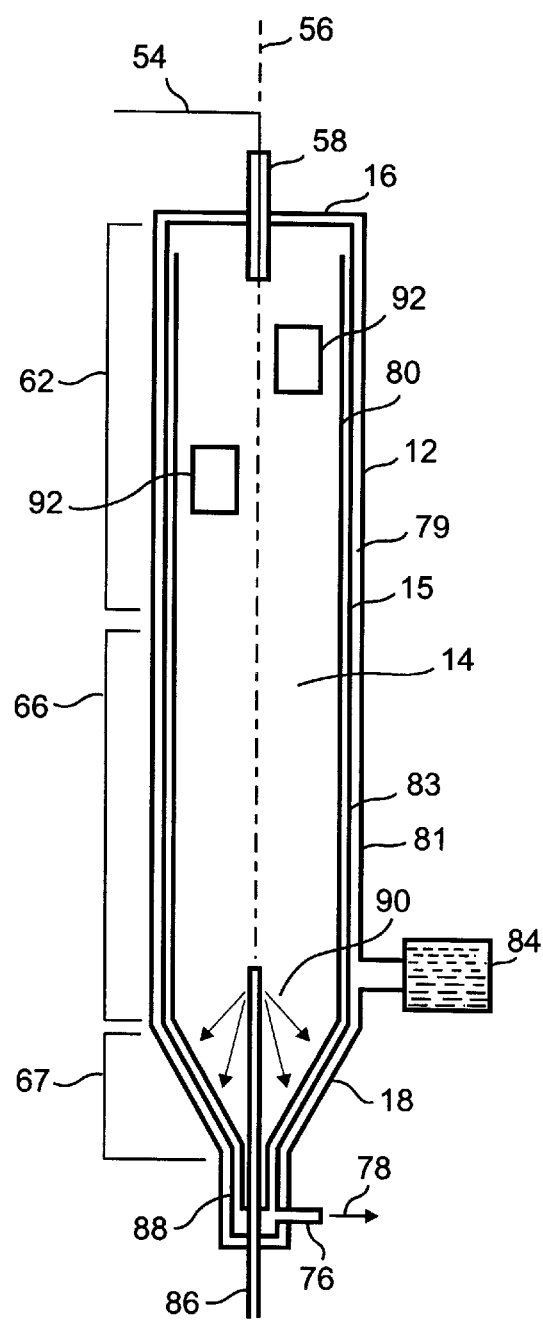
FIG. 4 is a schematic cross-sectional representation for yet another embodiment of the reactor for the present invention.

Alternately, as shown in FIG. 4, a purge fluid 84, such as air, nitrogen, or water can be released into the gap 83 between the inner wall 79 and the pressure bearing wall 81 to keep contaminants from flowing into the gap 83.

Several additional, alternative structures are presented for the vessel 12 in FIGS. 3 and 4. Specifically, an alternate quenching section 67 is shown. For the alternate quenching section 67, a hollow central shaft 86 is inserted into the reactor chamber 14 through an access 88 at the bottom 18 of the chamber 14. A quenching spray 90 can then be directed toward access 88 for quenching the reacted material before it is withdrawn through exit port 76 as reactor effluent 78. As is intended for the present invention this quenching results, as indicated above, by lowering temperatures to the point where sticky solids in the stream 60 (shown in FIG. 2) can be re-dissolved and flushed from the lower portion of the reactor chamber 14.

Attached to the hollow central shaft 86 is a scraper device 80. This scraper device 80 is substantially cylindrical and extends along the side walls 15 of the reactor. The scraper device 80 is rotated by rotation of the hollow central shaft 86 to remove solid deposits from the wall of the reactor. The scraper device 80 may be of a blade-type design as described in U.S. Pat. No. 5,100,560, or any other workable geometry. For example, the scraping device 80 may include a cylinder with multiple cut-outs 92, i.e., openings in the cylinder. The cut-outs 92, shown in FIGS. 3 and 4, are for exemplary purposes only. Alternatively, a scraper utilizing axial or oscillatory movement rather than rotational movement may be employed. With the axial design, it is possible to have the scraper element submersed in quenched fluid when in the retracted position, allowing the element to be kept free of solids deposits. In an alternate embodiment, an auger type device might be used to dislodge solids from the walls 15 and/or the exit port 76. Another alternate design could utilize more than one exit from the reactor chamber 14, proximate the bottom end 18.

Returning now to FIG. 1, it will be seen that as the reaction stream 60 is removed from the vessel 12 it is passed through the line 82 to a cooler 96. As contemplated for system 10, the cooler 96 may use regenerative heat exchange with cool reactor stream, or heat exchange with ambient or pressurized air, or a separate water supply such as from a steam generator (not shown). Once cooled by the cooler 96, the high pressure reactor stream is then depressurized. Preferably, depressurization is accomplished using a capillary 98. It will be appreciated, however, that a pressure control valve or orifice (not shown) can be used in lieu of, or in addition to, the capillary 98.

After the effluent 78 from the reactor chamber 14 has been both cooled by the cooler 96 and depressurized by capillary 98, it can be sampled through the line 100. Otherwise, the effluent 78 is passed through the line 102 and into the liquid-gas separator 104. To allow accumulation of a representative sample in separator 104, it can be diverted to either tank 106 during startup of the system 10, or to tank 108 during the shutdown of system 10. During normal operation of the system 10, the line 110 and valve 112 can be used to draw off liquid 114 from the collected effluent. Additionally, gas 116 from the headspace of separator 104 can be withdrawn through the line 118 and sampled, if desired, from the line 120. Alternatively the gas 116 can be passed through the filter 122 and valve 124 for release as a nontoxic gas 126 into the atmosphere. As will be appreciated by the person of ordinary skill in the pertinent art, a supply tank 128 filled with an alkali neutralizing agent 130 can be used and the agent 130 introduced into the separator 104 via line 132 to counteract any acids that may be present.

The following examples of reactions which have been tested in the reactor chamber 14 are indicative of the results attainable by the system 10.

EXAMPLE 1

In this experiment the ability of the invention to process sticky salts was tested. The salt feed utilized for the test was a combination of sodium sulfite and monosodium phosphate, which upon passage through the reactor gave a mixture of sodium sulfate and monosodium phosphate in a weight ratio of about two to one (2:1). A titanium lined reactor 11.1 centimeters internal diameter ("ID") by 158 centimeters long was utilized. Table 1 summarizes the reaction conditions used. Assuming a salt density of 2.6 g/cc, which gives the lower bound of salt volume, it is calculated that at least 1.5 reactor volumes of salt were processed over the eight (8) hour course of the run. During this period, system pressures were constant within about 100 psi, indicating that a steady state operation had been achieved. Simultaneously, high destruction efficiency of the ethanol organic feed was obtained. As shown in Table 1, the high degree of back-mixing imparted allows high destruction efficiency to be achieved even with the injection of feed at ambient temperature.

TABLE 1

| Salt Handling Experiment | |
| --- | --- |
| Reactor temperature | 570° C. |
| Reactor pressure | 3400 psi |
| Air flow rate | 2.6 kilograms/minute |
| Auxiliary fuel (ethanol) flow rate | 0.15 kilograms/minute |
| Salt solution flow rate | 0.67 kilograms/minute |
| Feed temperature | 20° C. |
| Reactor residence time | 23 seconds |
| Salt concentration | 20.77% |
| Salt throughput rate | 8.3 kilograms/hour |
| Quench flow rate | 1.95 kilograms/minute |
| Total run duration | 500 minutes |
| Total salt precipitated in reactor | 50 kilograms |
| Total organic carbon removal | >99.99% |

EXAMPLE 2

In this experiment the ability of the invention to process a complex organic mixture was tested. In this case a real world feed comprised of Hazard Class 1.1 solid rocket propellant, hydrolyzed with aqueous ammonium hydroxide, was used. Following hydrolysis, any remaining oversized particles were filtered out to facilitate pumping. The composition of the original propellant material is given in Table 2a. During the hydrolysis pretreatment, the aluminum metal component is partly converted to aluminum hydroxide, a non-sticky solid. Subsequently, in the hydrothermal treatment reactor, this material may be partially converted to the non-sticky solid aluminum oxide. Table 2b summarizes the reaction conditions used. Thus, this test indicates the ability of the present invention to handle non-sticky oxides as well as sticky salts at high loadings. Equally as important, this test demonstrates the robust nature of the oxidation reaction when processing complex organic mixtures which may contain refractory constituents. As in the preceding example, a titanium-lined reactor was utilized, although of somewhat different dimensions, i.e., 8.8 centimeters ID by 183 centimeters in length. During the run, system pressures were constant within about 100 psi, indicating that a steady state operation had been achieved. It will be noted from Table 2b that auxiliary fuel was not required due to the high organic content of the waste material. Furthermore, because the solids being handled were non-sticky, no quenching flow was required at the reactor exit.

TABLE 2a

| Propellant Composition (wt. %) | |
| --- | --- |
| Nitrocellulose | 21.6 |
| Nitroglycerin | 29.6 |
| HMX | 10.8 |
| Ammonium perchlorate | 10.8 |
| Aluminum | 19.8 |
| Triacetin | 5.3 |

TABLE 2a-continued

| Propellant Composition (wt. %) | |
| --- | --- |
| Resorcinol | 1.1 |
| 2-nitrodiphenylamine | 1.0 |

TABLE 2b

| Complex Feed Experiment | |
| --- | --- |
| Reactor temperature | 577° C. |
| Reactor pressure | 4000 psi |
| Oxygen flow rate | 9.5 kilograms/hour |
| Auxiliary fuel flow rate | None |
| Hydrolyzed propellant solution flow rate | 74.8 kilograms/hour |
| Reactor residence time | 48 seconds |
| Hydrolyzed propellant concentration | 20.9% |
| Solids throughput rate | 5.9 kilograms/hour |
| Quench flow rate | None |
| Total run duration | 500 minutes |
| Total solids through reactor | 23 kilograms |
| Total organic carbon removal | >99.9% |

EXAMPLE 3

In this experiment the use of a substantially subcritical operating pressure was tested. Table 3 summarizes the reaction conditions used. This test again demonstrates the robust nature of the oxidation reactions, even when using a comparatively low density reaction phase. The titanium-lined reactor of Example 1 was utilized for this test. Because there was no need to show a large amount of solids processed, the duration of this run was kept relatively short.

TABLE 3

| Low Pressure Experiment | |
| --- | --- |
| Reactor temperature | 555° C. |
| Reactor pressure | 690 psi |
| Air flow rate | 1.7 kilograms/hour |
| Feed (kerosene) flow rate | 0.09 kilograms/hour |
| Water flow rate | 0.63 kilograms/hour |
| Feed temperature | 25° C. |
| Reactor residence time | 7 seconds |
| Total run duration | 65 minutes |
| Total organic carbon removal | >99.999% |

While the particular downflow hydrothermal treatment method and system as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims. For example, the features of the plug flow section 66 and the quenching section 67 may be used together or independently in the practice of the present invention.

What is claimed is:

1. A method for processing feed material which includes at least one reactant and water, under conditions wherein the temperature is within a range from above approximately 374° C. to approximately 800° C. and pressure is above approximately 25 bar, the method comprising the steps of:

mixing the feed material in a high shear mixer;

initiating reaction in a reactor chamber by jet mixing the feed material from a plurality of nozzles in a back-mixing section of the reactor chamber to create a reaction stream, the reaction chamber having a longitudinal axis; wherein the step of initiating the reaction includes directing the feed material substantially along the longitudinal axis of the reaction chamber so that the feed material does not directly impinge upon a side wall of the reaction chamber and contact of the feed material with the side wall of the reaction chamber is minimized;

carrying out additional reaction in the reaction stream in a plug flow section of the reactor chamber, the plug flow section being positioned lower than the back-mixing section; and discharging the reaction stream from an exit port of the reactor chamber which is positioned lower than the plug flow section;

wherein the flow of the reactor stream through the reactor chamber is substantially in one direction;

wherein each nozzle releases a stream which contains at least a portion of the feed material, each stream being inclined toward the longitudinal axis and directed toward each other stream for collision between the streams.

2. The method of claim 1 further comprises the step of orienting the reactor chamber substantially vertical so that gravitational forces act generally parallel to the longitudinal axis of the reactor chamber in a direction from a top end of the reactor chamber towards a bottom end of the reactor chamber.

3. The method of claim 1 further comprising the step of quenching the reaction stream with a relatively cool fluid in a quenching section prior to discharge from the exit port, the quenching section being positioned lower than the plug flow section.

4. The method of claim 3 wherein the step of quenching the reaction stream with a relatively cool fluid includes the step of quenching with water.

5. The method of claim 3 wherein step of quenching the reaction stream with a relatively cool fluid includes the step of quenching with an aqueous solution which includes a neutralizing agent.

6. The method of claim 1 including the step of removing solids from the reactor vessel with a mechanical device.

7. The method of claim 6 wherein the step of removing solids includes utilizing a substantially cylindrical scrapper which includes at least one cut-out.

8. The method of claim 1 including the step of transferring heat from a side wall of the reactor to the back-mixing section to propagate the reaction.

9. The method of claim 1 further comprising the step of providing a reactor chamber having a corrosion resistant liner.

10. The method of claim 9 wherein the step of providing a reactor chamber includes positioning the corrosion resistant liner so that a gap exists between the corrosion resistant liner and a pressure shell.

11. The method of claim 10 wherein the step of providing a reaction chamber includes positioning insulation within at least a portion of the gap.

12. The method of claim 10 including the step of introducing a purge stream within at least a portion of the gap.

13. The method of claim 1 including the step of providing feed material which includes an oxidant.

14. The method of claim 1 including the step of providing feed material which includes an oxidant selected from a group consisting of air, oxygen, hydrogen peroxide, nitric acid, nitrous acid, nitrate and nitrite.

15. The method of claim 1 including the step of providing a feed material which includes an oxidant and a combustible material.

16. The method of claim 1 including the step of providing a feed material substantially at an ambient temperature to the reaction chamber.

17. The method of claim 1 including the step of preheating at least a portion of the feed material to above an ambient temperature prior to the step of initiating reaction.

18. The method of claim 17 wherein the step of preheating includes heat transfer from the reaction stream which is discharged from the reactor chamber to at least a portion of the feed material.

19. The method of claim 1 including the step of providing the feed material to the reaction chamber in a single stream.

20. The method of claim 1 including the step of providing the feed material to the reaction chamber in a plurality of streams.

21. A method for processing feed material which includes at least one reactant and water, under conditions wherein the temperature is within a range from above approximately 374° C. to approximately 800° C. and pressures above approximately 25 bar, the method comprising the steps of:
  initiating reaction in a substantially vertical reactor chamber by jet mixing the feed material in a back-mixing section to form a reaction stream, the reaction chamber having a longitudinal axis; wherein the step of initiating the reaction includes directing the feed material substantially along the longitudinal axis of the reaction chamber so that the feed material does not directly impinge upon a side wall of the reaction chamber and contact of the feed material with the side wall of the reaction chamber is minimized;
  carrying out additional reaction in the reaction stream in a plug flow section of the reactor chamber, the plug flow section being positioned lower than the back-mixing section;
  quenching the reaction stream by introducing a relatively cool temperature, quenching fluid into a quenching section of the reactor chamber, the quenching section being positioned below the plug flow section;
  discharging substantially the entire reaction stream from an exit port of the reactor chamber, the exit port being positioned below the quenching section;
  wherein the flow of the reactor stream through the reactor chamber is substantially in one direction;
  wherein the quenching fluid is directed toward the exit port to assist in flushing at least a portion of the reactor stream from the reaction chamber.

22. The method of claim 21 wherein the step of quenching the reaction stream includes the step of quenching with water.

23. The method of claim 21 wherein step of quenching the reaction stream includes the step of quenching with an aqueous solution including a neutralizing agent.

24. The method of claim 21 including the step of removing solids from the reactor vessel with a mechanical device.

25. The method of claim 24 wherein the step of removing solids includes utilizing a substantially cylindrical scrapper which includes at least one cut-out.

26. The method of claim 21 further comprising the step of providing a reactor chamber having a corrosion resistant liner.

27. The method of claim 26 wherein the step of providing the reactor chamber includes positioning the corrosion resistant liner so that a gap exists between the corrosion resistant liner and a pressure shell.

28. The method of claim 27 wherein the step of providing a reaction chamber includes positioning insulation within at least a portion of the gap.

29. The method of claim 26 including the step of introducing a purge stream within at least a portion of the gap.

30. The method of claim 21 including the step of providing feed material which includes an oxidant.

31. The method of claim 21 including the step of providing a feed material which includes an oxidant and a combustible material.

32. The method of claim 21 including the step of providing a feed material substantially at an ambient temperature to the reaction chamber.

33. The method of claim 21 including the step of preheating at least a portion of the feed material above an ambient temperature prior to the step of initiating reaction.

34. The method of claim 21 including the step of transferring heat from a side wall of the reactor to the back-mixing section to propagate the reaction.

35. The method of claim 1 wherein the reaction chamber has a length to diameter ratio of at least 6:1.

36. The method of claim 1 wherein the reaction chamber has a length to diameter ratio of at least 10:1.

37. The method of claim 1 wherein the reaction chamber has a length to diameter ratio of at least 20:1.

38. The method of claim 1 wherein the reaction chamber has a length to diameter ratio of at least 30:1.

39. The method of claim 1 wherein the reaction chamber has a length to diameter ration of at least 40:1.

40. The method of claim 1 including the step of quenching the reaction stream by introducing a relatively cool temperature, quenching fluid into a quenching section of the reaction chamber, the quenching section being positioned below the plug flow section; wherein the quenching fluid is directed towards the exit port to assist in flushing at least a portion of the reaction stream from the reaction chamber.

41. The method of claim 21 wherein the reaction chamber has a length to diameter ratio of at least 6:1.

42. The method of claim 21 wherein the reaction chamber has a length to diameter ratio of at least 10:1.

43. The method of claim 21 wherein the reaction chamber has a length to diameter ratio of at least 20:1.

44. The method of claim 21 wherein the reaction chamber has a length to diameter ratio of at least 30:1.

45. The method of claim 21 wherein the reaction chamber has a length to diameter ration of at least 40:1.

46. The method of claim 21 wherein the step of initiating reaction includes releasing at least a portion of the feed material from a plurality of nozzles, each nozzle releasing a stream which contains at least a portion of the feed material, each stream being inclined toward the longitudinal axis and directed towards each other stream for collision between the streams.

* * * * *